US008471603B2

(12) United States Patent
Chang et al.

(10) Patent No.: US 8,471,603 B2
(45) Date of Patent: Jun. 25, 2013

(54) CURRENT DRIVER, ELECTRONIC DEVICE AND CURRENT DRIVING METHOD

(75) Inventors: Tsung-Hau Chang, Hsinchu (TW); Ting-Wei Liao, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 137 days.

(21) Appl. No.: 13/076,412

(22) Filed: Mar. 30, 2011

(65) Prior Publication Data

US 2012/0139588 A1 Jun. 7, 2012

(30) Foreign Application Priority Data

Dec. 6, 2010 (TW) .............................. 99142425 A (51) Int. Cl.
*H03B 1/00* (2006.01)
(52) U.S. Cl.
USPC ........................................................ 327/108
(58) Field of Classification Search
USPC ......................................... 327/108, 112, 427
See application file for complete search history.

(56) References Cited

U.S. PATENT DOCUMENTS

| 5,862,096 A * | 1/1999 | Yasuda et al. ................. 365/229 |
| 6,680,837 B1 | 1/2004 | Buxton |
| 7,969,206 B2 * | 6/2011 | Ito ................................. 327/108 |

FOREIGN PATENT DOCUMENTS

| TW | 200623590 | 7/2006 |
| TW | 200719589 | 5/2007 |

* cited by examiner

*Primary Examiner* — Hai L Nguyen
(74) *Attorney, Agent, or Firm* — Winston Hsu; Scott Margo (57) ABSTRACT

The present invention provides a current driver for driving a current driven device. The current driver includes a driving circuit, configured to generate a driving current to drive the current driven device, and conduct or cut off a driving current path through which the driving current flows according to a voltage level of a driving control node, and an accelerating circuit, coupled to the driving control node of the driving circuit, configured to provide an accelerating current flowing through the driving control node to accelerate a voltage level transition at the driving control node during an activation period of the driving circuit, and automatically cut off the accelerating current when a voltage level of the driving control node reaches a specific level.

24 Claims, 10 Drawing Sheets

CURRENT DRIVER, ELECTRONIC DEVICE AND CURRENT DRIVING METHOD

BACKGROUND OF THE INVENTION

1. Field of the Invention

The present invention relates to current driving technique, and more particularly, to a current driver and a driving method capable of quickly generating driving current to drive a current driven device.

2. Description of the Prior Art

A current driver is utilized for generating a driving current to drive a current driven device, such as a laser diode, an LED, and other devices that are driven by current. In general, a current driver often utilizes a voltage buffer to control a gate voltage of a driving transistor, such that the driving transistor conducts and generates a driving current to drive a current driven device. In such a situation, when the current driver is switched from an off state to an activation state, the voltage buffer has to charge or discharge a gate of the driving transistor, to increase or decrease the gate voltage to be greater than or less than a source voltage by a threshold voltage, such that the driving transistor starts conducting and generating the driving current for enabling the driving current driven device to operate normally.

Figure 1A:
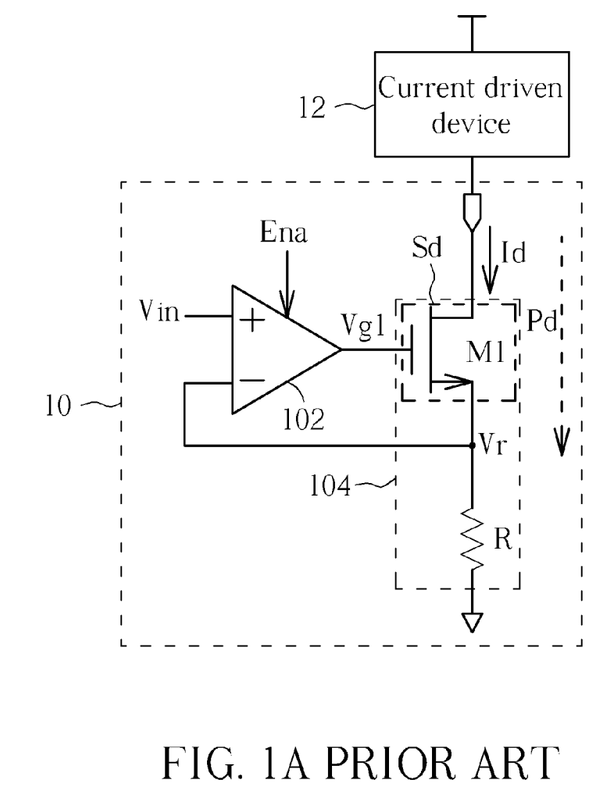
FIG. 1A is a schematic diagram of a conventional current driver.

Please refer to FIG. 1A, which is a schematic diagram of a conventional current driver 10. The current driver 10 is utilized for generating a driving current Id to drive a current driven device 12. The current driver 10, for example, can include a voltage buffer 102, for receiving an input voltage Vin to generate an output voltage Vout, and further includes a bias current source 104, for receiving control of the output voltage Vout to generate the driving current Id1.

Specifically, the voltage buffer 102 includes an input terminal for receiving the input voltage Vin, another input terminal coupled to the bias current source 104, and an output terminal for providing the output voltage Vout. On the other hand, the bias current source 104 can, for example, include a driving switch Sd and one or more resistance elements, e.g. a resistor R. The driving switch Sd is disposed on a driving current path Pd, utilized for receiving the control of the output voltage Vout to conduct or cut off the driving current path Pd. The driving switch Sd can be realized by a driving transistor M1, e.g. an NMOSFET transistor, with a gate receiving the output voltage Vout of the voltage buffer 102, i.e. a gate voltage Vg1=the output voltage Vout, a drain coupled to the current driven device 12, and a source coupled to the resistor R and one of input terminals of the voltage buffer 102. The resistor R can be coupled between the source of the driving transistor M1 and a reference voltage level, e.g. a ground voltage level.

Figure 1B:
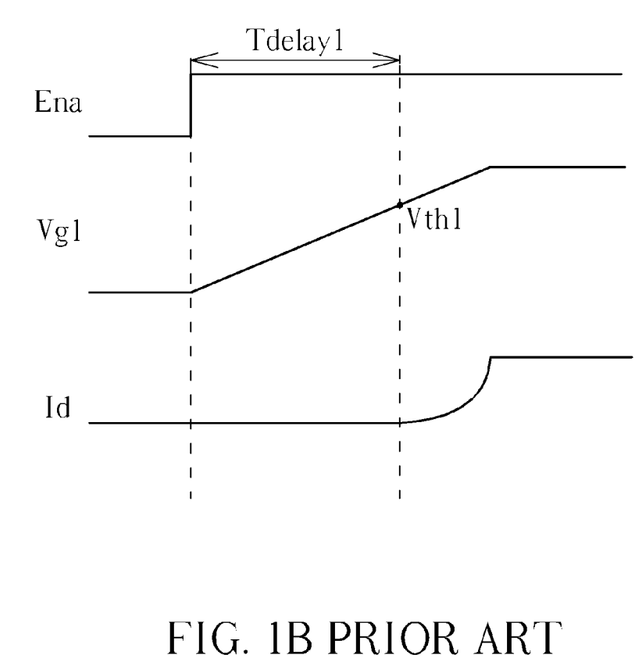
FIG. 1B is a schematic diagram of waveforms of an activation signal, a gate voltage and a driving current of the current driver shown in FIG. 1A.

Please refer to FIG. 1B, which is a schematic diagram of waveforms of an activation signal Ena, the gate voltage Vg1 and the driving current Id of the current driver 10 shown in FIG. 1A, utilized for illustrating operating principles of the current driver 10. As shown in FIG. 1B, when the activation signal Ena is at a low voltage level, the voltage buffer 102 is not activated, causing the output voltage Vout, i.e. the gate voltage Vg1 of the driving transistor M1, to remain at a low voltage level. As a result, the driving transistor M1 cuts off and does not generate the driving current Id.

Conversely, after the activation signal Ena switches to a high voltage level to activate the voltage buffer 102, the output voltage Vout starts rising to charge the gate of the driving transistor M1. When the gate voltage Vg1 rises to be greater than the source voltage by a threshold voltage Vth1, the driving transistor M1 starts conducting and generating the driving current Id to drive the current driven device 12. Then, the voltage buffer 102 continues charging the gate of the driving transistor M1. Simultaneously, a negative feedback fixes the voltage Vr at a voltage level of the input voltage Vin maintaining a level of the driving current Id at Vin/R.

In such a situation, as shown in FIG. 1B, there exists a delay time Tdelay1 from the time when the level of the activation signal Ena is switched to the time when the driving transistor M1 starts conducting. In other words, the delay time Tdelay1 is a charging time required for increasing the gate voltage Vg1 by the threshold voltage Vth1. Additionally, some more time is required for the output voltage Vout of the voltage buffer 102 to rise. More disadvantageously, the driving transistor M1 is often realized by a power MOS with a greater size and hence a greater capacitance, the delay time Tdelay1 can actually be much longer. As a result, after the current driver 10 is activated, a lot of time is wasted before the current driven device 12 starts operating.

Similarly, operations of other conventional current drivers applying P-type driving transistors, which can be analogized by referring to the above operations, require a lot of discharging delay time as well. As a result, for applications that require repetitive switching on and off of the current driven device, high frequency operations can not be realized due to the excessively long delay time. Since the long delay time can not meet requirement of high frequency operations, there is a need for improvement of the prior art.

SUMMARY OF THE INVENTION

It is therefore an objective of the disclosure to provide a current driver, an electronic device utilizing the same and a driving method that are capable of quickly generating a driving current to drive a current driven device.

An embodiment discloses a current driver for driving a current driven device. The current driver includes a driving circuit, configured to generate a driving current to drive the current driven device, and conduct or cut off a driving current path through which the driving current flows according to a voltage level of a driving control node; and an accelerating circuit, coupled to the driving control node of the driving circuit, configured to provide an accelerating current flowing through the driving control node to accelerate a voltage level transition of the driving control node during an activation period of the driving circuit, and automatically cutoff the accelerating current when the voltage level of the driving control node reaches a preset level.

Another embodiment further discloses an electronic device. The electronic device includes a current driven device, for receiving driving of a driving current; and the above current driver, for providing the driving current.

A further embodiment further discloses a current driving method for driving a current driven device. The current driving method includes steps of generating a driving current flowing through a driving current path to drive the current driven device, and conducting or cutting off the driving current path according to a voltage level of a driving control node; and providing an accelerating current flowing through the driving control node to accelerate a voltage level transition of the driving control node during an activation period of starting generating the driving current, and automatically cutting off the accelerating current when a voltage of the driving control node reaches a preset level.

These and other objectives of the present invention will no doubt become obvious to those of ordinary skill in the art after

DETAILED DESCRIPTION

Figure 2A:
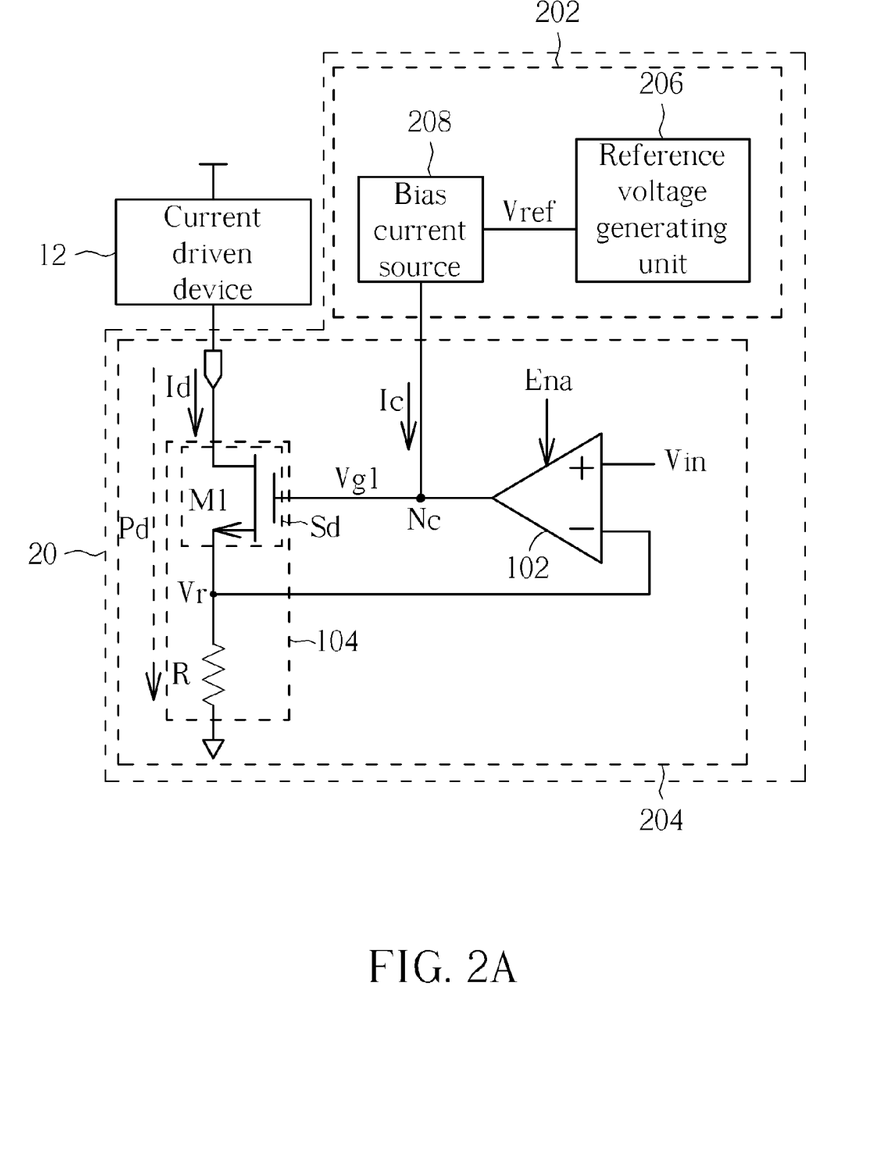
FIG. 2A is a block structure diagram of a current driver according to another embodiment.

Please refer to FIG. 2A, which is a block structure diagram of a current driver 20 according to an embodiment. The current driver 20 includes a driving circuit 204 and an accelerating circuit 202. The driving circuit 204 is configured to generate a driving current Id to drive a current driven device 12. Detailed structures and operations of the driving circuit 204, for example, can be configured to be similar to those of the current driver 10 shown in FIG. 1, including the buffer amplifier 102 and the bias current source 104. Additionally, the driving circuit 204 and the current driven device 12 can be disposed in any electronic device.

On the other hand, a main difference between the current driver 10 and 20 is that the current driver 20 further includes the accelerating circuit 202. During an activation period of the driving circuit 204, the accelerating circuit 202 can be simultaneously activated to provide an accelerating current Ic flowing through a driving control node Nc of the driving circuit 204, so as to facilitate the rising of a voltage level of the driving control node Nc, thereby accelerating the generation of the driving current Id.

Preferably, the driving control node Nc can be selected from any nodes of the driving circuit 204 that can control conducting or cutting off a driving current path Pd through which the driving current Id flows. In the driving circuit 204 of this embodiment, the gate of the driving transistor M1 can be selected as the driving control node Nc. During the activation period of the driving circuit 204, the gate of the driving transistor M1 (e.g. an NMOSFET transistor), namely, the driving control node Nc, starts being charged by the output voltage of the buffer amplifier 102. Meanwhile, since the accelerating circuit 202 is simultaneously activated, the accelerating current Ic can flow from the accelerating circuit 202 to the gate of the driving transistor M1. As a result, the accelerating current Ic can charge the gate of the driving transistor M1, facilitating the rising of the gate voltage level, and thereby accelerating the generation of the driving current Id.

Besides, the accelerating circuit 202 can be further configured to automatically cut off the accelerating current Id when the voltage of the driving control node Nc reaches a specific voltage level. In a specific embodiment, during the activation period of the driving circuit 204, if the voltage level of the driving control node Nc switches from a first voltage level to a second voltage level to switch the driving transistor M1 from cutting off to stably conducting, the specific voltage level can be set between the first voltage level and the second voltage level, or at most equal to the second level. Under a proper design, the specific voltage level can be set at a level of the threshold voltage Vth1 of the driving transistor M1. In other words, the accelerating current Id can e be automatically cut off at a time point when the driving transistor M1 starts conducting to generate the driving current Id.

FIG. 2A also illustrates a block structure diagram of the accelerating circuit 202 according to an embodiment. In this embodiment, the accelerating circuit 202 can include a reference voltage generating unit 206 and a bias current source 208. The reference voltage generating unit 206 can provide a reference voltage Vref. The bias current source 208, coupled between the driving control node Nc and the reference voltage generating unit 206, can be biased by the voltage of the driving control node Nc and the reference voltage Vref to conduct or cut off the accelerating current Ic. Preferably, it can be designed such that the bias current source 208 automatically cuts off the accelerating current Ic when the voltage level of the driving control node Nc rises to a preset level, at which it differs from the voltage level of the reference voltage Vref by a specific value. In other words, the accelerating current Ic can be automatically cut off at a time point when the voltage level of the driving control node Nc=the preset level=the reference voltage−the specific value.

Figure 2B:
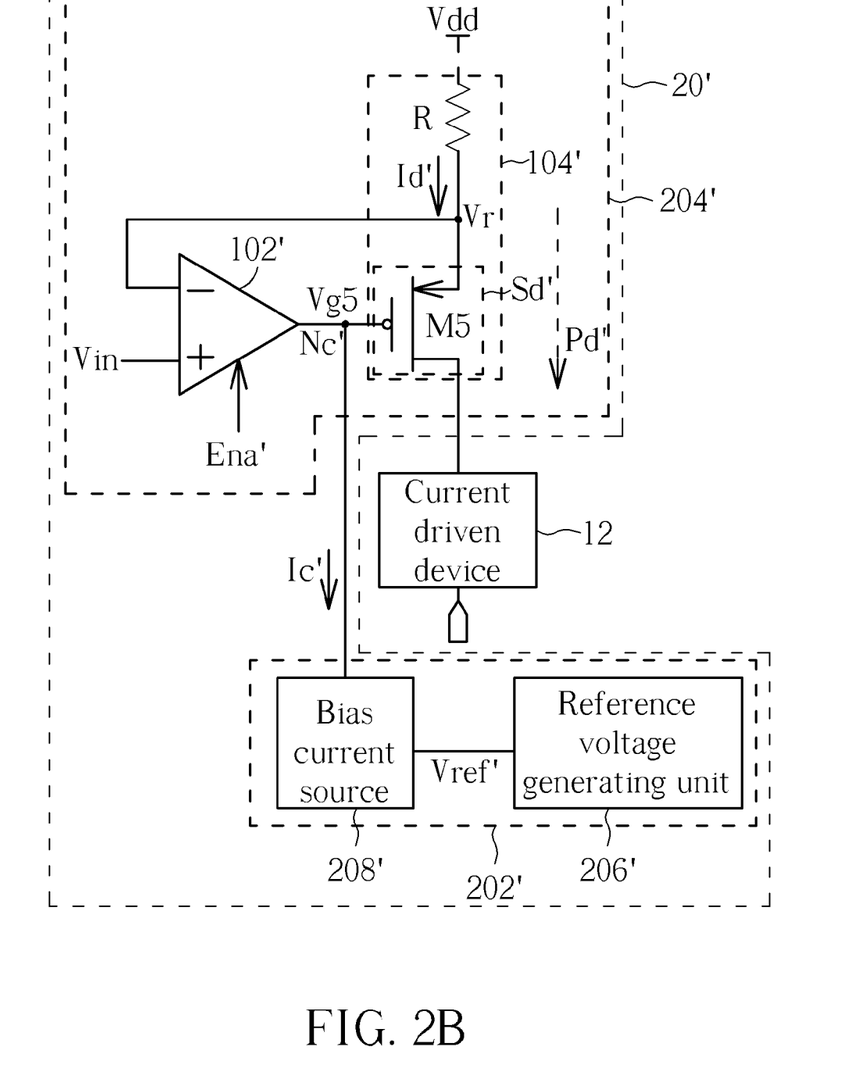
FIG. 2B is another embodiment a current driver of block structure diagram.

Please refer to FIG. 2B, which is a block structure diagram of a current driver 20' according to another embodiment of the present invention. Structures and operations of the current driver 20' shown in FIG. 2B are similar to those of the current driver 20 shown in FIG. 2A, with a main difference that flow directions of a driving current and an accelerating current are reversed.

In detail, in a driving circuit 204', a driving transistor M5 can be realized by a PMOSFET transistor instead, which can therefore generate a driving current Id' flowing toward the current driven device 12. In order to adapt to this modification, a direction of an accelerating current Ic' can be generated from the driving control node Nc, i.e. a gate of the driving transistor M5, to an accelerating circuit 202' to facilitate the discharging of the driving transistor M5. In such a configuration, the gate of the driving transistor M5 starts to be discharged by an output voltage of a buffer amplifier 102' during the activation period of the driving circuit 204', while the accelerating current Ic' can simultaneously discharge the gate of the driving transistor M5 to facilitate the falling of the gate voltage level, further accelerating the generation of the driving current Id'.

Similarly, in a specific embodiment, the accelerating circuit 202' can include a reference voltage generating unit 206', for providing a reference voltage Vref', and includes a bias current source 208', biased by the voltage of the driving control node Nc' and the reference voltage Vref' to conduct or cut off the accelerating current Ic'. Preferably, the bias current source 208' can automatically cut off the accelerating current Ic' when the voltage of the driving control node Nc' falls to a preset level, at which it differs from the voltage level of the reference voltage Vref' by a specific value. In other words, the instant voltage level of the driving control node Nc'=the preset level=the reference voltage+the specific value. Other detailed structures and operations of the current driver 20' are similar to those of the current driver 20, and thus are not narrated hereinafter.

Figure 3A:
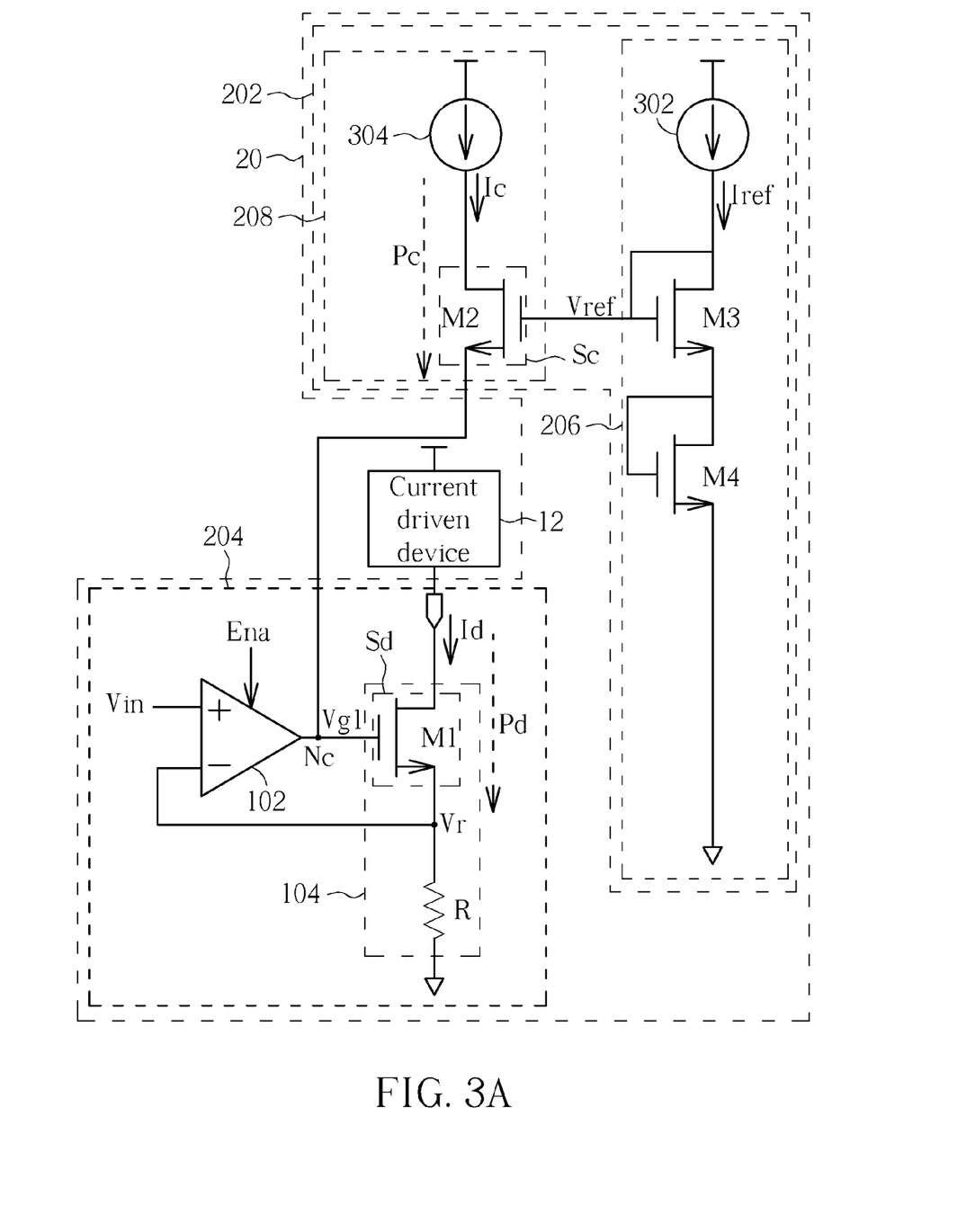
FIG. 3A is a detailed circuit diagram of the current driver shown in FIG. 2A according to an embodiment.

Please refer to FIG. 3A, which is a detailed circuit diagram of the current driver 20 shown in FIG. 2A according to an embodiment, utilized as an example for illustrating detailed circuits of the accelerating circuit 202 and detailed operations of the current driver 20. In this embodiment, structures and operations of the driving circuit 204 are similar to those of the current driver 10, and thus elements and signals with the same functions are denoted by the same symbols, and detailed operations are not narrated hereinafter.

On the other hand, in this embodiment, the bias current source 208 of the accelerating circuit 202 includes a control switch Sc, which is disposed on an accelerating current path Pc and utilized for receiving the control of the driving control node Nc to conduct or cut off the accelerating current path Pc. The control switch Sc can, for example, be realized by a control transistor M2, e.g. an NMOSFET transistor, including a gate receiving the reference voltage Vref, a drain coupled to a power supply 304, and a source coupled to the driving control node Nc.

In such a configuration, whether the control transistor M2 conducts or cuts off automatically depends on a voltage level difference between a gate voltage Vg2, i.e. the reference voltage Vref, and the voltage of the driving control node Nc, i.e. the gate voltage Vg1 of the driving transistor M1. More specifically, when the accelerating circuit 202 and the driving circuit 204 are simultaneously activated, since the voltage level difference between the reference voltage Vref and the gate voltage Vg1, which is at a reference voltage level such as zero at the activation moment, is greater than a threshold voltage Vth2 of the control transistor M2, that is, Vref−Vg1=Vref>Vth2, the control transistor M2 can automatically conduct, thus generating the accelerating current Ic to charge the gate of the driving transistor M1, further facilitating the rising of the level of the gate voltage Vg1 of the driving transistor M1, and thereby accelerating the generation of the driving current Id. Then, when the gate voltage Vg1 continues to rise to an extent that the voltage level difference between the reference voltage Vref and the gate voltage Vg1 is less than the threshold voltage Vth2, i.e. Vref−Vg1<Vth2, i.e. the threshold voltage Vth2 in this embodiment=the specific value defined by relevant description of FIG. 2A, the control transistor M2 is automatically cut off, stopping generating the accelerating current Ic, and no more charging the driving control node Nc.

Please continue to refer to FIG. 3A, which further illustrates a detailed structure of the reference voltage generating unit 206 according to a specific embodiment of the present invention. In this specific embodiment, the reference voltage generating unit 206 includes a plurality of transistors connected in series, e.g. two transistors M3 and M4 (e.g. both NMOSFET transistors in this embodiment). These transistors M3 and M4 are connected in series between a power supply 302 and a reference voltage level, e.g. a ground voltage level, and each with a gate and a drain connected with each other. In such a configuration, the reference voltage Vref can be determined according to a reference current Iref as follows:

$$Vref = Vth4 + \sqrt{\frac{Iref}{Kn4}} + Vth3 + \sqrt{\frac{Iref}{Kn3}},$$

wherein Kn3 and Kn4 are constants of a NMOS saturation region formula.

When the reference current Iref is designed to be very small, and each of the transistors M1~M4 is designed to have a similar threshold voltage Vth, the above formula can become as follows:

$$Vref \approx Vth4 + Vth3 \approx 2Vth$$

As can be seen from the above, a cut-off condition for the control transistor M2 is Vref−Vg1<Vth2, which under this design can be further expressed as: 2Vth−Vg1<Vth, or Vth<Vg1. In other words, with a proper design, when the gate voltage Vg1 of the driving transistor M1 is charged to rise to around the threshold voltage Vth, the accelerating current Ic is cut off. This automatic cutting off occurs just at the time point when the driving transistor M1 starts conducting and generating the driving current Id.

Figure 3B:
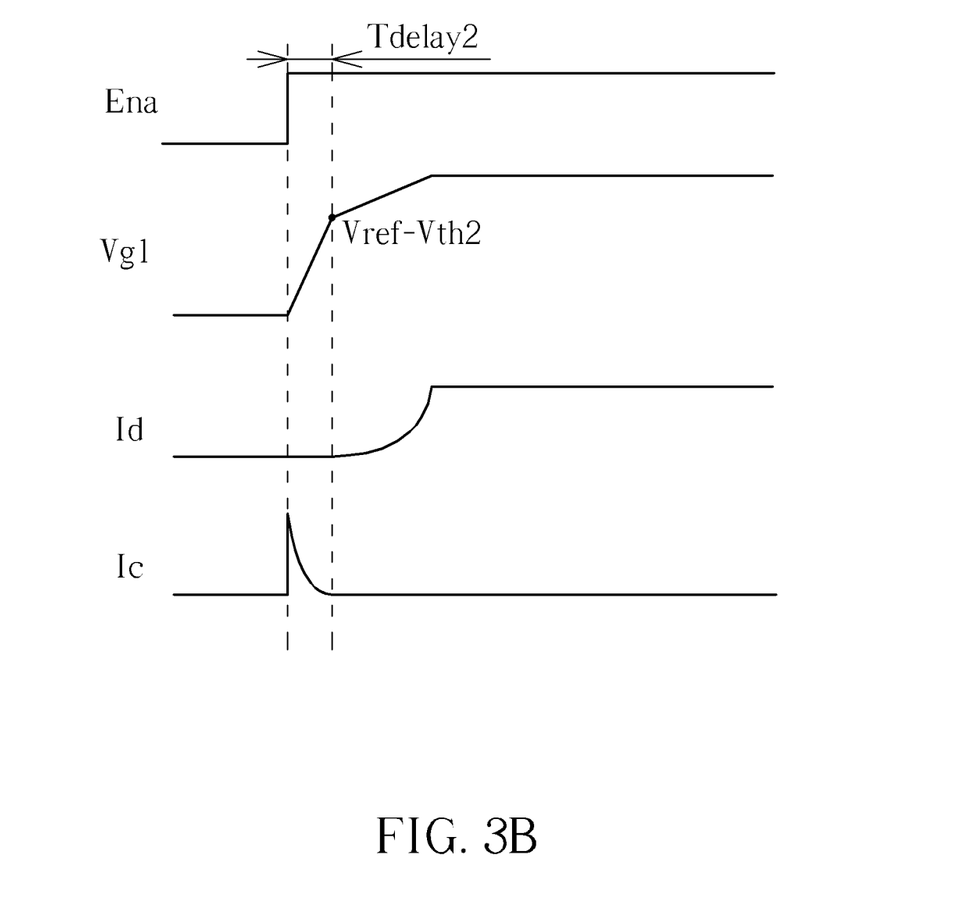
FIG. 3B is a schematic diagram of waveforms of an activation signal, a gate voltage, a driving current and an accelerating current of the current driver shown in FIG. 3A.

Please refer to FIG. 3B, which is a schematic diagram of waveforms of the activation signal Ena, the gate voltage Vg1, the driving current Id and the accelerating current Ic of the current driver 20 shown in FIG. 3A, utilized for illustrating operating principles of the current driver 20. As shown in FIG. 3B, when the activation signal Ena is at a low voltage level that does not activate the driving circuit 204 and the accelerating circuit 202, the gate voltage Vg1 is at a low voltage level, e.g. zero. In response, the driving transistor M1 does not conduct, and the control transistor M2 does not conduct accordingly.

Then, when the activation signal Ena is switched to a high voltage level to activate the driving circuit 204 and the accelerating circuit 202, the voltage buffer 102 charges the gate voltage Vg1. Meanwhile, since a voltage level difference between the gate voltage Vg2 of the control transistor M2, i.e. the reference voltage Vref, and a source voltage of the control transistor M2, i.e. the gate voltage Vg1 of the driving transistor M1, is greater than the threshold voltage Vth2 of the control transistor M2, i.e. Vg2−Vg1>Vth2, the control transistor M2 conducts, generating the accelerating current Ic that flows through the accelerating current path Pc to the gate of the driving transistor M1, further facilitating the rise of the gate voltage Vg1, thereby accelerating the generation of the driving current Id.

Afterwards, the gate voltage Vg1 continues to rise such that the voltage level difference between the gate voltage Vg1, i.e. the reference voltage Vref, and the source voltage, i.e. the driving transistor M1 the gate voltage Vg1, of the control transistor M2 is less than the threshold voltage Vth2, i.e. Vg2−Vg1<Vth2. Accordingly, the control transistor M2 automatically cuts off the accelerating current path Pc, and stopping charging the gate of the driving transistor M1. As described above, the specific voltage level can be properly designed to be Vth1, i.e. a level for the driving transistor M1 to start conducting and generating the driving current Id.

Then, the voltage buffer 102 alone continues to charge the gate of the driving transistor M1 with a slower rate, causing the driving current Id to continue rising. Simultaneously, the negative feedback fixes the voltage Vr at the level of the input voltage Vin, keeping the level of the driving current Id at Vin/R.

By referring to the waveforms shown in FIG. 3B to observe a rising rate of the gate voltage Vg1 of the driving transistor M1, it can be seen that a voltage rising rate during a conducting period of the control transistor M2 is much higher (e.g. more than ten times) than a voltage rising rate during a cut-off period of the control transistor M2. Since the rising rate of the gate voltage Vg1 can be accelerated in this embodiment, a delay time Tdelay2 can be significantly reduced compared with the delay time Tdelay1 shown in FIG. 1B. In other words, the driving current Id can be generated quickly.

To sum up, the accelerating circuit 202 can conduct the accelerating current path Pc when the activation signal Ena activates the driving circuit 204, to generate the accelerating current Ic to charge the driving control node Nc, so as to accelerate generating the driving current Id. Besides, the accelerating circuit 202 can further automatically cut off the accelerating current Ic when the voltage of the driving control node Nc, i.e. the gate voltage Vg1, rises to a specific value, to stop charging the driving control node Nc without extra control circuits for cutting off the accelerating current Ic.

Figure 4A:
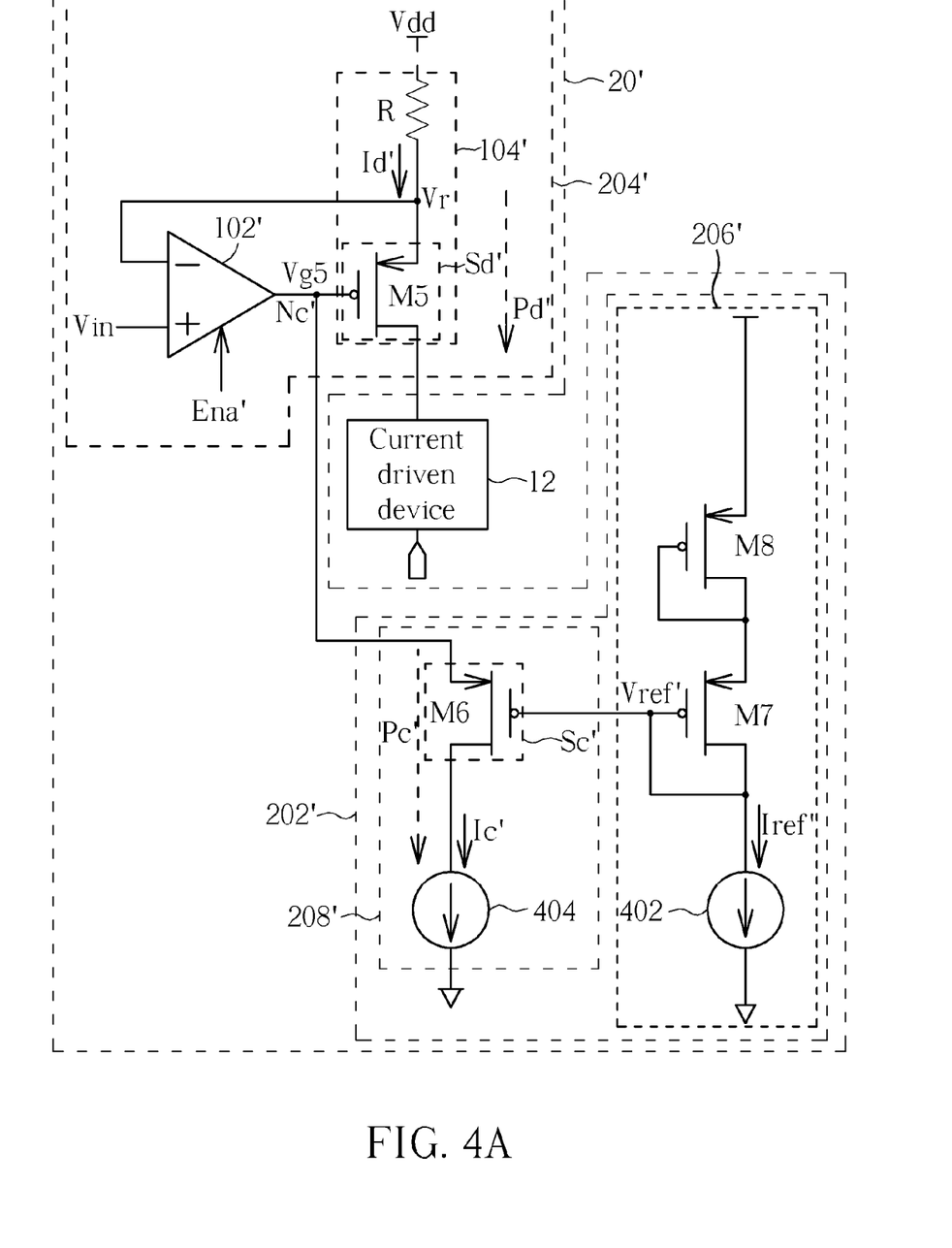
FIG. 4A is a detailed circuit diagram of the current driver shown in FIG. 2B according to an embodiment.

Please refer to FIG. 4A, which is a detailed circuit diagram of the current driver 20' shown in FIG. 2B according to an embodiment of the present invention. In this embodiment, structures and operations of the driving circuit 204' are similar to those of the current driver 10. A main difference is that the driving transistor M1 is replaced by a driving transistor M5, e.g. a PMOSFET transistor, of the driving circuit 204'. Therefore, during the activation period of the driving circuit 204', the gate of the driving transistor M5 starts to be discharged by the output voltage of the buffer amplifier 102', so as to reduce the voltage level of the gate of the driving transistor M5 to conduct a driving current path Pd'. Detailed functions of each element can be derived by referring to the current driver 10, and thus are not narrated hereinafter.

Similar to the bias current source 208 shown in FIG. 3A, the bias current source 208' of the accelerating circuit 202' includes a control switch Sc', which is disposed on the accelerating current path Pc', and utilized for receiving the control of the driving control node Nc' to conduct or cut off the accelerating current path Pc'. The control switch Sc' can be realized by a control transistor M6, e.g. a PMOSFET transistor. The control transistor M6 includes a gate receiving the reference voltage Vref', a source coupled to power supply 404, and a drain coupled to the driving control node Nc'.

In such a configuration, whether the control transistor M6 conducts or cuts off automatically depends on a voltage level difference between a gate voltage Vg6, i.e. the reference voltage Vref', and the voltage of the driving control node Nc', i.e. the gate voltage Vg5 of the driving transistor M5. More specifically, when the accelerating circuit 202' and the driving circuit 204' are simultaneously activated, since the voltage level difference between the reference voltage Vref' and gate voltage Vg5, which at the activation moment is at a reference voltage level such as Vdd, is greater than a threshold voltage Vth6 of the control transistor M6, i.e. Vg5−Vref'=Vdd−Vref'>Vth6, the control transistor M6 can automatically conduct, thus generating the accelerating current Ic' that can discharge the gate of the driving transistor M5, thereby accelerating the conducting of the driving transistor M5 and the generation of the driving current Id'. Then, when gate voltage Vg5 continues to fall to an extent that the voltage level difference between the reference voltage Vref' and the gate voltage Vg5 is less than the threshold voltage Vth6, i.e. Vg5−Vref'<Vth6, the control transistor M6 is automatically cut off, thus stopping generating the accelerating current Ic', and no more discharging the driving control node Nc'.

Please continue to refer to FIG. 4A, which further illustrates a detailed structure of the reference voltage generating unit 206' according to a specific embodiment. In this specific embodiment, the reference voltage generating unit 206' includes a plurality of transistors connected in series, e.g. two transistors M7 and M8, which can both be PMOSFET transistors. The two transistors M7 and M8 are connected in series between a power supply 402 and a reference voltage level, which, for example, can be a voltage level Vdd higher than the ground voltage level, and each with a gate and a drain connected with each other. In such a configuration, the reference voltage Vref' can be determined according to a reference current Iref' as follows:

$$Vref' = Vdd - \left(Vth8 + \sqrt{\frac{Iref'}{Kn8}} + Vth7 + \sqrt{\frac{Iref'}{Kn7}}\right),$$

wherein Kn7 and Kn8 are constants of a PMOS saturation region formula.

When the reference current Iref' is designed to be very small, and each of the transistors M5-M8 is designed to have a similar threshold voltage Vth', the above formula can become as follows:

$$Vref' = Vdd - (Vth8 + Vth7)Vdd - 2Vth'.$$

As can be seen from the above, a cut-off condition for the control transistor M6 is: Vg5−Vrer<Vth6, which under this design can be further expressed as: Vg5−(Vdd−2Vth')<Vth', or Vg5<Vdd−Vth'. In other words, with a proper design, when the gate voltage Vg5 of the driving transistor M5 falls by a threshold voltage Vth' to reach a specific voltage level Vdd−Vth', the accelerating current Ic' is cut off. This automatic cutting off occurs just at the time point when the driving transistor M5 starts conducting and the driving current Id' starts generating.

Figure 4B:
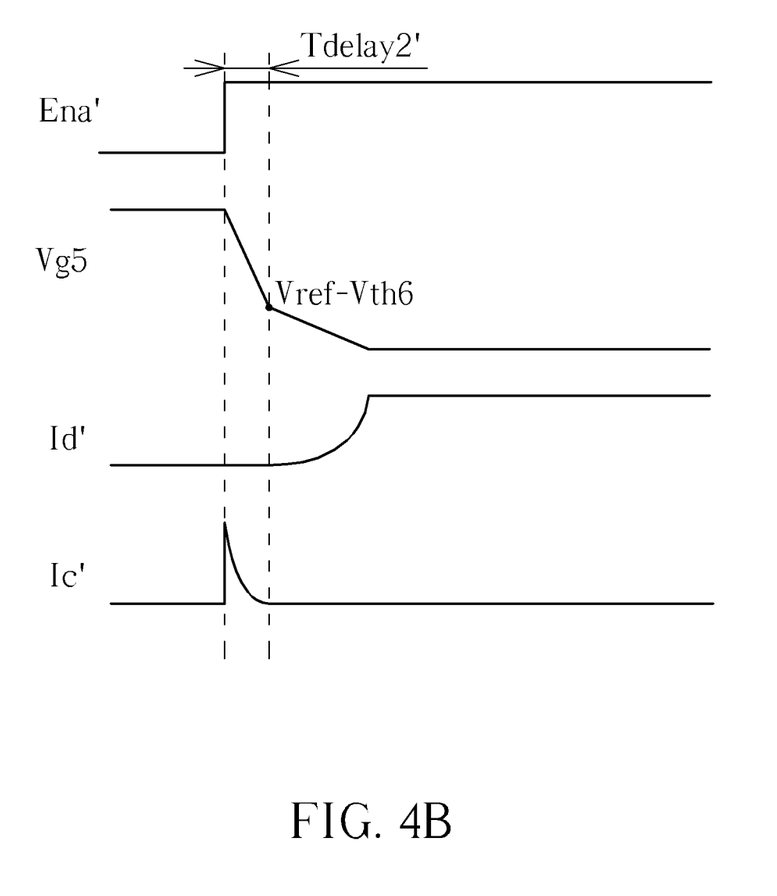
FIG. 4B is a schematic diagram of waveforms of an activation signal, a gate voltage, a driving current and an accelerating current of the current driver shown in FIG. 4A.

Please refer to FIG. 4B, which is a schematic diagram of waveforms of an activation signal Ena', the gate voltage Vg5, the driving current Id' and the accelerating current Ic' of the current driver 20' shown in FIG. 4A, utilized for illustrating operating principles of the current driver 20' shown in FIG. 4A. As shown in FIG. 4B, when the activation signal Ena' is at a low voltage level that does not activate the driving circuit 204' and the accelerating circuit 202', the gate voltage Vg5 is at a high voltage level, e.g. Vdd. In response, the driving transistor M5 does not conduct, and the control transistor M6 does not conduct accordingly.

Then, when the activation signal Ena' is switched to a high voltage level to activate the driving circuit 204' and the accelerating circuit 202', an output terminal of the voltage buffer 102' can discharge the gate of the driving transistor M5. Meanwhile, because a voltage level difference between a source voltage of the control transistor M6, i.e. the gate voltage Vg5 of the driving transistor M5, and the gate voltage Vg6, i.e. the reference voltage Vref', is greater than the control transistor M6 of the threshold voltage Vth6, i.e. Vg5−Vg6>Vth6, the control transistor M6 starts conducting, thus generating the accelerating current Ic' that flows from the gate of the driving transistor M5 through the accelerating current path Pc', further facilitating the falling of the gate voltage Vg5, thereby accelerating the generation of the driving current Id'.

Afterwards, the gate voltage Vg5 continues falling to reach a preset level such that the voltage level difference between the source voltage of the control transistor M6, i.e. the gate voltage Vg5 of the driving transistor M5, and the gate voltage Vg5, i.e. the reference voltage Vref', is less than the threshold voltage Vth6, i.e. Vg5−Vref'<Vth6. The threshold voltage Vth6 is the specific value defined by the above description. Accordingly, the control transistor M6 automatically cuts off the accelerating current path Pc', and stops discharging the gate of the driving transistor M5. As described above, the specific voltage level can be properly designed to be Vdd−Vth', i.e. a level for the driving transistor M5 to start conducting and generating the driving current Id'.

Then, the voltage buffer 102' alone continues to discharge the gate of the driving transistor M5 with a slower rate, causing the driving current Id' to continue rising. Simultaneously, the negative feedback fixes the voltage Vr at the level of the input voltage Vin, keeping the level of the driving current Id' at Vin/Rof.

By referring to the waveforms shown in FIG. 4B to observe a falling rate of the gate voltage Vg5 of the driving transistor M5, it can be seen that a voltage falling rate during a conducting period of the control transistor M6 is much higher (e.g., more than ten times) than a voltage falling rate during a cut-off period of the control transistor M6. Since the falling rate of the gate voltage Vg5 can be accelerated in this embodiment, a delay time Tdelay2' can be significantly reduced compared with that in a configuration without the accelerating circuit 202'. In other words, the driving current Id' can be generated quickly.

To sum up, the accelerating circuit 202' can provide the accelerating current Ic' to discharge the driving control node Nc' when the activation signal Ena' activates the driving circuit 204', so as to accelerate the generation of the driving current Id'. Besides, the accelerating circuit 202' can further automatically cut off the accelerating current Ic' when the voltage of the driving control node Nc', i.e. the gate voltage Vg5, falls to a specific value, e.g. Vref'+Vth6 in this embodiment, to stop discharging the driving control node Nc', without extra control circuits for cutting off the accelerating current Ic'.

Noticeably, in the embodiments shown in FIG. 3A-3B and FIG. 4A-4B, the control switches Sc and Sc' of the bias current source 208 and 208' are both illustrated by transistors as an example. Other than a MOSFET, the transistor can be replaced with any electronic element with threshold voltage characteristics such as a MESFET, a JFET as well. Furthermore, the control switches Sc and Sc' can be realized by any other switch devices capable of switching current paths, and the switch device can include one or more electronic elements, as long as the switch device has a first terminal which can be, directly or indirectly, coupled to the reference voltage, and a second terminal, which can be, directly or indirectly, coupled to the driving control node, and the switch can automatically conduct or cut off an accelerating current path according to a voltage level difference between the first terminal and second terminal.

Besides, one or more resistance elements of other types, e.g. with passive resistance such as a resistor, or with active resistance such as a transistor, can be added, and connected in series between the power supply and the control switch, and/or between the control switch and the driving control node. Besides, the power supplies 304 and 404 are both illustrated as current sources. However, each of the power supplies 304 and 404 can be a voltage source or any power supply circuit block capable of providing an accelerating current to flow through the control switch as well, and can be disposed inside or outside the accelerating circuit 204 and 204', respectively.

Besides, similarly, in the embodiments shown in FIG. 3A-3B and FIG. 4A-4B embodiment, the transistors M3-M4 and M7-M8 of the reference voltage generating units 206 and 206' are utilized as resistance elements. However, various different voltage generating circuits can be applied to provide the reference voltage. For example, in other embodiments, one or more resistance elements of the same or different types, e.g. with passive resistance such as a resistor, or with active resistance such as a transistor, or combinations thereof can be applied, connected in series between the power supply and the reference voltage level, with any connection node thereof for outputting the reference voltage. Besides, the power supplies 302 and 402 are both illustrated as current sources. However, each of the power supplies 302 and 402 can be a voltage source, or any other power supply circuit block capable of enabling the current Iref to flow through the reference transistors M3-M4 or M7-M8 as well, and can be disposed inside or outside the accelerating circuit 204 and 204', respectively.

Figure 5A:
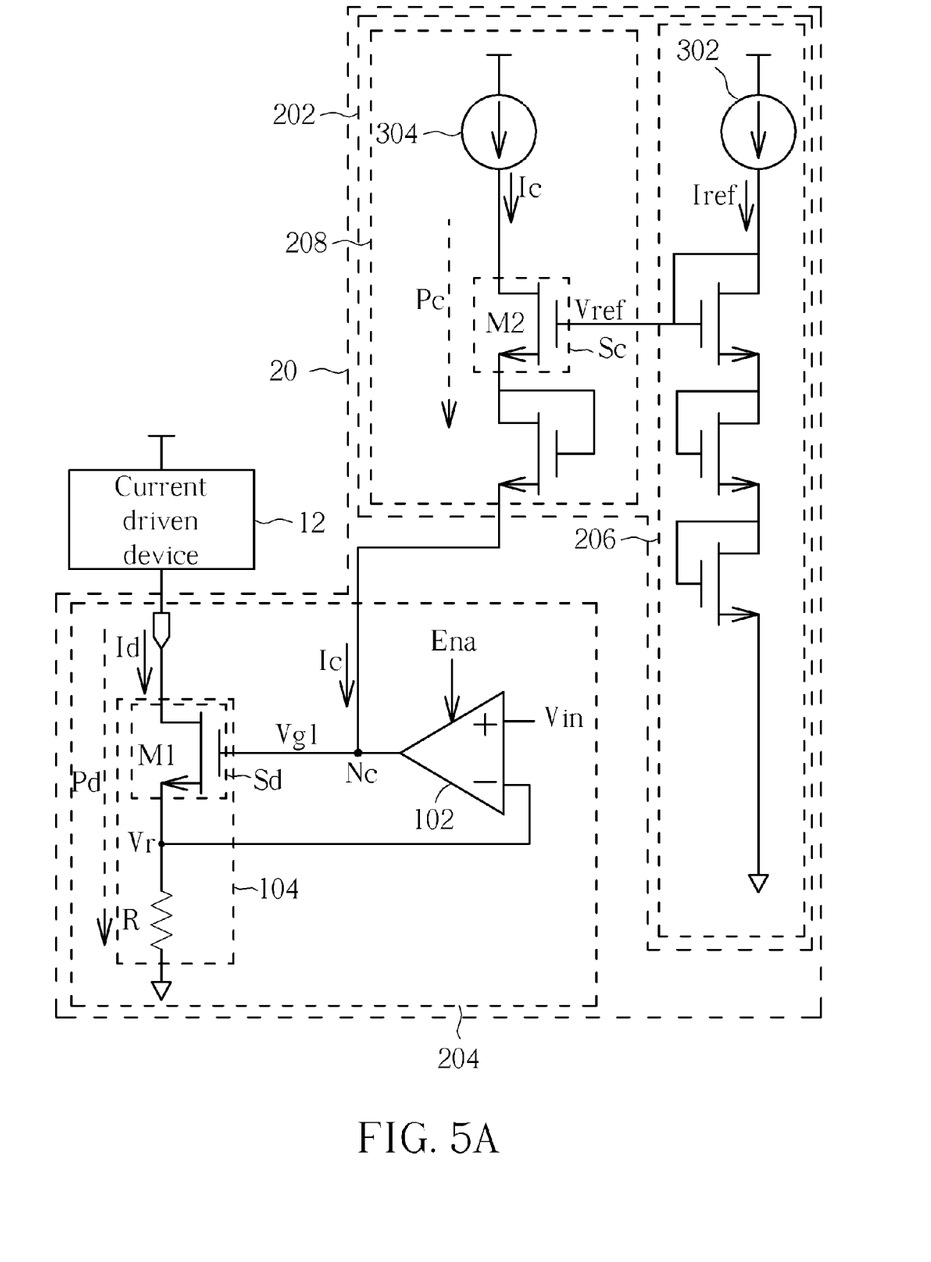
FIG. 5A and FIG. 5B are detailed circuit diagrams of the current drivers shown in FIGS. 2A and 2B according to other embodiments, respectively.
Figure 5B:
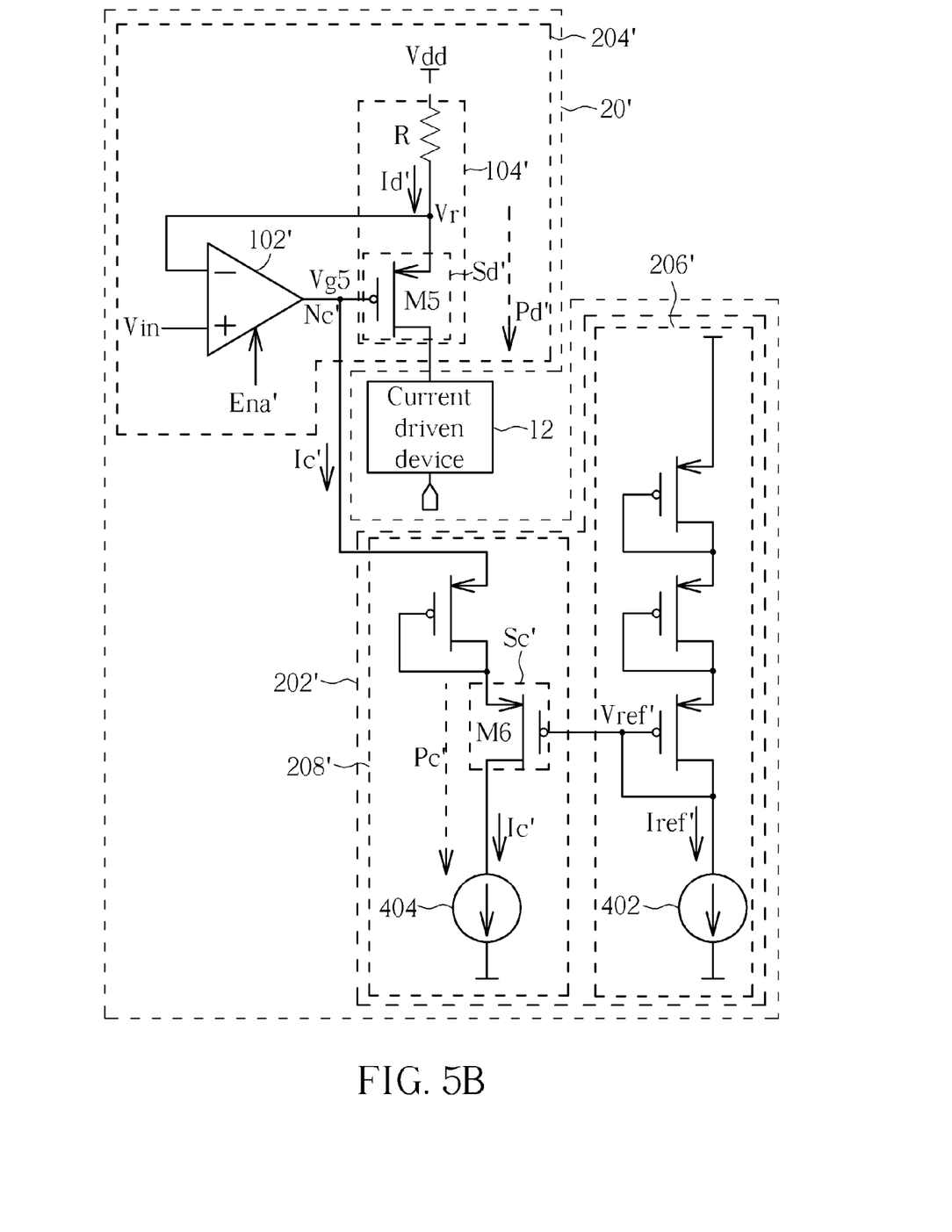

Please refer to FIG. 5A and 5B, which are detailed circuit diagrams of the current driver 20 and 20' shown in FIG. 2A and 2B according to other embodiments, respectively, and are also alterations of embodiments of FIG. 3A and 4A, respectively. By comparing FIG. 3A with FIG. 5A, or FIG. 4A with FIG. 5B, it can be seen that a main difference between the two is that the bias current sources 208 and 208' are added with one or more transistors (e.g. one transistor in the embodiments) respectively. The one or more transistors can be connected in series between the source of the control transistor M2 and the gate of the driving transistor M1, and connected in series between the source of the control transistor M6 and the gate of the driving transistor M5, respectively. Besides, the reference voltage generating units 206 and 206' can have more resistance elements, e.g. transistors in the embodiments.

Noticeably, structures and related descriptions of the accelerating circuits of the above embodiments and the bias current sources and the reference voltage generating circuits thereof are only exemplary embodiments for illustrating, and realizations are not limited to specific rules. Any modifications can be made, as long as when the driving circuit is activated, the accelerating circuit is simultaneously activated to generate an accelerating current to charge or discharge a driving control node, so as to accelerate the conduction of a driving current path. Besides, under circumstances of utilizing a reference voltage generating unit and a bias current source to realize an accelerating circuit, realizations are not limited to specific rules. Any modifications can be made, as long as the reference voltage generating unit can generate voltage, and the bias current source can receive the reference voltage and the bias of a control node of the driving circuit, so as to automatically conduct or cut off an accelerating current path. Those skilled in the art should make modifications or alterations accordingly, which are not limited to detailed structures and operations shown in FIG. 2A-2B to FIG. 5A-5B.

Figure 6:
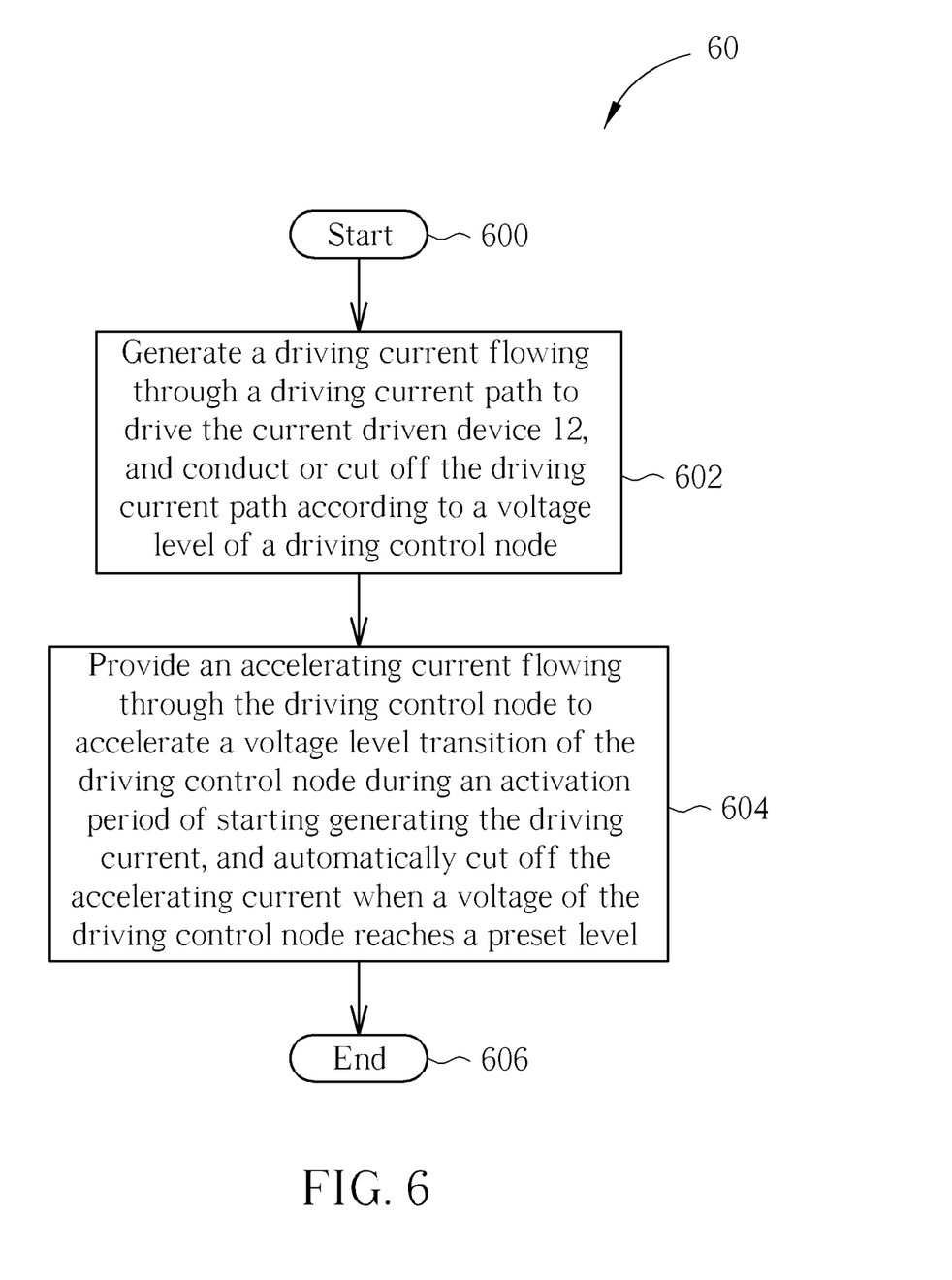
FIG. 6 is a schematic diagram a current driving process according to an embodiment.

Current driving methods of each of the above embodiments can be summarized into a current driving process 60 as shown in FIG. 6. The current driving process 60 includes following steps:

Step 600: Start.

Step 602: Generate a driving current flowing through a driving current path to drive the current driven device 12, and conduct or cut off the driving current path according to a voltage level of a driving control node.

Step 604: Provide an accelerating current flowing through the driving control node to accelerate a voltage level transition of the driving control node during an activation period of starting generating the driving current, and automatically cut off the accelerating current when a voltage of the driving control node reaches a preset level.

Step 606: End.

Details of each step can be derived by referring to corresponding components of the accelerating circuits 202, 202', and are not narrated hereinafter.

To sum up, the delay time of the prior art wastes excessively long time and therefore cannot meet requirements of high frequency applications. In comparison, the above embodiments add an accelerating circuit to quickly conduct the driving current path, and therefore can shorten the delay time of the activation period of the driving circuit. Additionally, the accelerating circuit can timely and automatically cut off the accelerating current without any extra control circuits. Therefore, the above embodiments can meet requirements of various high frequency applications.

Those skilled in the art will readily observe that numerous modifications and alterations of the device and method may be made while retaining the teachings of the invention.

What is claimed is:

1. A current driver for driving a current driven device, comprising:
    a driving circuit, configured to generate a driving current to drive the current driven device, and conduct or cut off a driving current path through which the driving current flows according to a voltage level of a driving control node; and
    an accelerating circuit, coupled to the driving control node of the driving circuit, configured to provide an accelerating current flowing through the driving control node to accelerate a voltage level transition of the driving control node during an activation period of the driving circuit, and automatically cut off the accelerating current when the voltage level of the driving control node reaches a preset level.

2. The current driver of claim 1, wherein the accelerating circuit comprises:
    a reference voltage generating unit, for generating a reference voltage; and
    a bias current source, coupled between the driving control node and the reference voltage generating unit, and biased by a voltage of the driving control node and the reference voltage to conduct or cut off the accelerating current.

3. The current driver of claim 2, wherein the bias current source automatically cuts off the accelerating current when the voltage level of the driving control node transits such that a voltage level difference between the reference voltage and the voltage of the driving control node is less than a specific value.

4. The current driver of claim 2, wherein the bias current source comprises a control switch, disposed on an accelerating current path, and having a first terminal coupled to the reference voltage and a second terminal coupled to the driving control node, for conducting or cutting off the accelerating current path according to a voltage level difference between the first terminal and the second terminal.

5. The current driver of claim 4, wherein the control switch comprises a control transistor, having a first terminal acting as the first terminal of the control switch, a second terminal acting as the second terminal of the control switch, and a third terminal coupled to a power supply.

6. The current driver of claim 5, wherein the control transistor cuts off to stop providing the accelerating current when a voltage level difference between the voltage of the driving control node and the reference voltage is less than a threshold voltage of the control transistor.

7. The current driver of claim 5, wherein the bias current source further comprises one or more resistance elements, each of which coupled in series to one of the second terminal and the third terminal of the control transistor, and coupled in series to one of the driving control node and the power supply.

8. The current driver of claim 2, wherein the reference voltage generating unit comprises one or more transistors connected in series, coupled between a power supply and a reference voltage level, and each transistor has a first terminal and a second terminal connected with each other, wherein a first terminal of a reference transistor of the one or more transistors outputs the reference voltage.

9. The current driver of claim 8, wherein the reference voltage generating unit further comprises one or more resistance elements, coupled in series to one of a second terminal and a third terminal of the reference transistor, and coupled to one of the power supply and the reference voltage level.

10. The current driver of claim 1, wherein the driving circuit comprises:
    a bias current source, biased by the driving control node to generate the driving current; and
    a voltage buffer, having an output terminal coupled to the driving control node, a first input terminal coupled to an input voltage, and a second input terminal coupled to the bias current source.

11. The current driver of claim 10, wherein the bias current source comprises a driving switch, disposed on a driving current path, for receiving control of the driving control node to conduct or cut off the driving current path.

12. The current driver of claim 11, wherein the driving switch comprises a driving transistor, having a first terminal as the driving control node, a second terminal outputting the driving current, and a third terminal coupled to the second input terminal of the voltage buffer.

13. The current driver of claim 12, wherein the bias current source further comprises one or more resistance elements, coupled between the third terminal of the driving transistor and a reference voltage level.

14. The current driver of claim 11, wherein the driving switch starts conducting to generate the driving current when the voltage of the driving control node reaches the preset level.

15. An electronic device, comprises:
    a current driven device, for receiving driving of a driving current; and
    a current driver, for providing the driving current, comprising:
        a driving circuit, configured to generate a driving current to drive the current driven device, and conduct or cut off a driving current path through which the driving current flows according to a voltage level of a driving control node; and
        an accelerating circuit, coupled to the driving control node of the driving circuit, configured to provide an accelerating current flowing through the driving control node to accelerate a voltage level transition of the driving control node during an activation period of the driving circuit, and automatically cut off the accelerating current when the voltage level of the driving control node reaches a preset level.

16. A current driver for driving a current driven device, comprising:
    a driving circuit, configured to generate a driving current to drive the current driven device; and
    an accelerating circuit, coupled to a driving control node of the driving circuit, configured to provide an accelerating current to the driving circuit to accelerate a voltage level transition of the driving control node during an activation period of the driving circuit, and automatically cut off the accelerating current when a voltage level of the driving control node reaches a preset level.

17. The current driver of claim 16, wherein the accelerating circuit comprises a control transistor, having a first terminal coupled to a reference voltage and a second terminal coupled to the driving control node, and conducting or cutting off the accelerating current according to a voltage level difference between the first terminal and the second terminal.

18. A current driving method for driving a current driven device, comprising:
generating a driving current flowing through a driving current path to drive the current driven device, and conducting or cutting off the driving current path according to a voltage level of a driving control node; and
providing an accelerating current flowing through the driving control node to accelerate a voltage level transition of the driving control node during an activation period of starting generating the driving current, and automatically cutting off the accelerating current when a voltage of the driving control node reaches a preset level.

19. The current driving method of claim 18, wherein the step of providing the accelerating current comprises:
generating a reference voltage; and
utilizing the voltage of the driving control node and the reference voltage to conduct or cut off the accelerating current.

20. The current driving method of claim 19, wherein the step of utilizing the voltage of the driving control node and the reference voltage to conduct or cut off the accelerating current comprises:
automatically cutting off the accelerating current when the voltage level of the driving control node transits such that a voltage level difference between the reference voltage and the voltage of the driving control node is less than a specific value.

21. A current driver for driving a current driven device, comprising:
a driving circuit, comprising:
a bias current source, biased by a driving control node to conduct or cut off a driving current, wherein the driving current is for driving the current driven device; and
a voltage buffer, having an output terminal coupled to the driving control node, a first input terminal coupled to an input voltage, and a second input terminal coupled to the bias current source; and
an accelerating circuit, comprising:
a reference voltage generating unit, for generating a reference voltage; and
a control switch, having a first terminal coupled to the reference voltage and a second terminal coupled to the driving control node, for conducting or cutting off an accelerating current according to a voltage level difference between the first terminal and the second terminal.

22. The current driver of claim 21, wherein the accelerating current is conducted during an activation period of the driving circuit, and is cut off when a voltage level of the driving control node reaches a preset level.

23. A current driver for driving a current driven device, comprising:
a driving circuit, comprising:
a driving transistor, having a first terminal as the driving control node, a second terminal coupled to the current driven device to drive the current driven device, and a third terminal; and
a voltage buffer, having an output terminal coupled to the driving control node, a first input terminal coupled to an input voltage, and a second input terminal coupled to the third terminal of the driving transistor;
an accelerating circuit, comprising:
a reference voltage generating unit, for generating a reference voltage; and
a control transistor, having a first terminal coupled to the reference voltage, a second terminal coupled to the driving control node, and a third terminal coupled to a power supply for providing an accelerating current flowing through the driving control node.

24. The current driver of claim 23, wherein the accelerating current is conducted during an activation period of the driving circuit, and is cut off when a voltage level of the driving control node reaches a preset level.

* * * * *